H. BIEDER.
REFRIGERATOR.
APPLICATION FILED APR. 19, 1909.
948,756.
Patented Feb. 8, 1910.
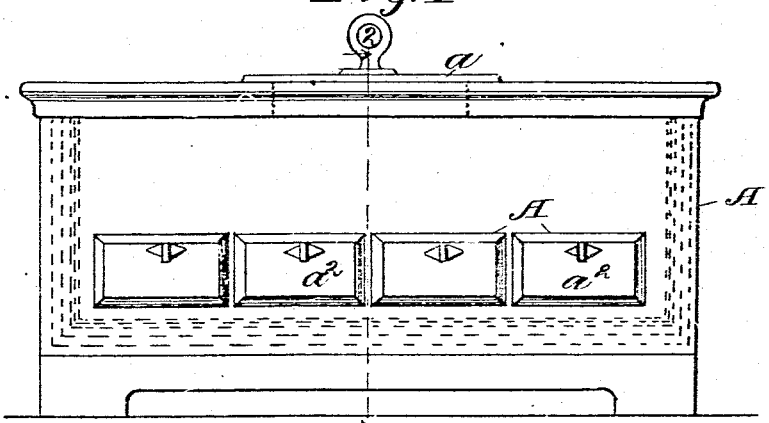
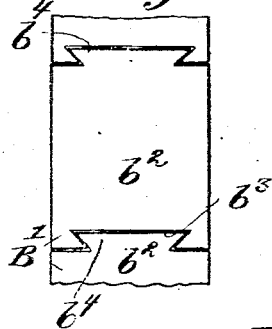
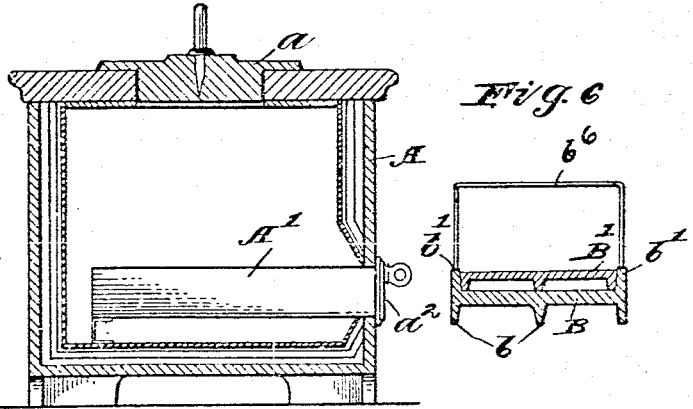
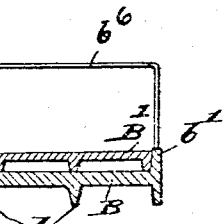
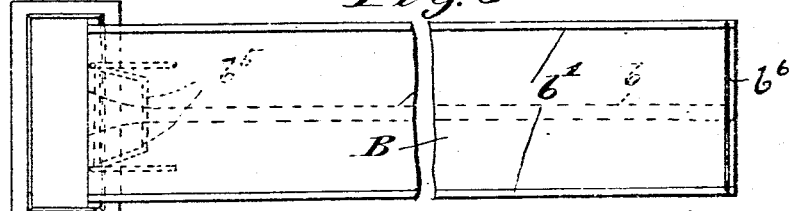
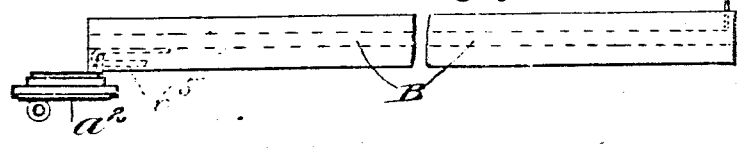
Witnesses:
Inventor:
Herman Bieder
by J. B. Fay
Attorney.

UNITED STATES PATENT OFFICE.

HERMAN BIEDER, OF ASHTABULA, OHIO.

REFRIGERATOR.

948,756.

Specification of Letters Patent.   Patented Feb. 8, 1910.

Application filed April 19, 1909. Serial No. 490,726.

*To all whom it may concern:*

Be it known that I, HERMAN BIEDER, a citizen of the United States, and a resident of Ashtabula, county of Ashtabula, and State of Ohio, have invented a new and useful Improvement in Refrigerators, of which the following is a specification, the principle of the invention being herein explained and the best mode in which I have contemplated applying that principle, so as to distinguish it from other inventions.

The present invention, while relating in general to refrigerators or refrigerating cabinets, is concerned more especially with apparatus of this kind designed for the handling or preservation of ices, and particularly ice cream, in brick form.

As is well known the universal method of dishing the material out to the customers in the retailing of ice cream and ices heretofore, has been to use spoon-like scoop or dipping devices, the material being stored in a can or like receptacle surrounded by the freezing mixture. Aside from the difficulty incident to handling ice cream in this manner, there has been another very serious objection from the standpoint of the dealer, namely, that by such method, the material is more or less compacted together, so that it is impossible to measure out of such vessel or receptacle, no matter how carefully the disher be graduated, the full quantity of material originally received therein; in other words, there is a residual loss in each can that apparently can not be avoided, while at the same time, the amount of material dealt out to the customer does not seem as large as it should be, for the same reason. The desirability, accordingly, of handling material of the character described in brick form instead of in receptacles such as cans or the like, will be evident, so that the desired quantity of material may be severed from the brick and thus served. A very considerable difficulty arises, however, when it is attempted to thus handle ice cream for reasons that will be readily understood, but chiefly on account of the difficulty of preserving the bricks at the necessary low temperature, and still accessible to the person serving the article.

The object of the refrigerator forming the present invention is to provide apparatus suitable for this particular use, and one that will hence incidentally serve to secure the economy just referred to. To the accomplishment of this and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—Figure 1 is a front elevation of a refrigerating cabinet embodying my invention in approved form; Fig. 2 is a transverse vertical sectional view of the same; Fig. 3 is a plan view of one of the shelves designed to hold bricks of ice-cream in said cabinet; Fig. 4 is a side elevation of such a shelf; Fig. 5 is a plan view of a sectional plate showing in detail the atachment of adjacent sections; and Fig. 6 is a transverse sectional view of the same.

In its general construction, the refrigerating chamber proper, is not presented as having features of novelty, consisting as it does, simply of a rectangular cabinet A, the walls of which are constructed of suitable heat insulating material, while the top is provided with a removable cover $a$ to permit ice to be inserted within the same. For holding the material, specifically the bricks of ice cream, separate cooling chambers or compartments A′ are preferably provided for each brick, there being four of these chambers in the apparatus, as illustrated in Fig. 1. Each such chamber is formed by a walled inclosure within the main body of the cabinet, access being had thereto at one end. It is to the details of the construction of such chambers, and particularly to that of the shelves provided therein for supporting the bricks of ice cream, that attention is desired.

Referring to Fig. 6, it will be seen that there is slidably held in each compartment A′, a shelf or plate B ribbed on its under side at $b$, so as to be raised slightly above the bottom of the compartment; the plate is also provided with an upwardly extending flange at each side, as at $b'$, so as to adapt the upper face of the plate for the reception of a supplementary plate B′. The latter is formed of sections $b^2$ and is likewise ribbed on its under side, so as to be raised in turn a slight distance above the main shelf or tray B. The sections of such slide are constructed so as to interengage, the one with the other, and thus permit the entire series to be drawn forwardly by pulling upon the foremost thereof. While such engagement between the sections may be had in any suitable way, they are preferably formed with dovetailed notches $b^3$ and complementary tongues $b^4$ in their respective ends, whereby they are held together for longitudinal movement, but may be readily detached when desired, by simply raising the one relatively to the other. The door $a^2$ closing the open end of the compartment is preferably hung from the main slide or shelf, a hook $b^5$ being provided, with this object in view, on the under side of such shelf near its forward end. In the normal position of the shelf, namely, when completely inserted within the compartment, the door is held securely attached to these hooks, but by drawing the shelf forward, such door may be easily detached, as will be evident. A standard, in the form of a looped wire $b^6$ at the rear end of shelf B, prevents the latter from tilting when pressure is exerted upon its forward end, as in cutting a section from the brick.

In use, then, the brick of ice cream is placed upon the supplementary slide B' resting on the shelf within a compartment, so that when the door $a^2$ is thereupon closed, it may be preserved indefinitely in the cooling chamber thus provided. When it is desired to sever a section or slice from a brick, the door is lowered and the shelf drawn forward, so as to cause the brick thereon to project the desired distance; the section is then severed therefrom, and the shelf, with the brick, returned to its normal position in the compartment. When the brick has been used back for a distance substantially equal to the length of one of the sections to the supplementary slide upon which it rests, leaving the foremost of the series of sections, in other words, clear, such foremost slide is seized and drawn forwardly, thus advancing the remainder of the brick to the forward end of the shelf, where successive sections may be severed without withdrawing said shelf any farther from the compartment than is initially necessary. This operation is repeated as often as a section of the supplementary slide is cleared, until the entire brick has been used up. By reason of the construction of this shelf for holding the brick within the compartments of my improved refrigerator, it will be seen that the length of the brick is a matter of indifference, since it is never necessary in the current use of the apparatus, to withdraw the slide from the refrigerating chamber for a distance greater than the length of one of the sections of the supplementary slide. It will be further evident that there is no complicated structure to get out of order, and that all the parts of the apparatus may be readily removed from the refrigerator and separated, thus facilitating the cleansing of the same when this becomes desirable.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In a refrigerator, the combination of a cooling chamber, and a sectional plate supported therein and adapted to receive the article to be cooled, said plate being movable to advance successive sections thereof beyond said chamber, and said sections being detachable, one from the other, when thus advanced.

2. In a refrigerator, the combination of a cooling chamber, a tray movable within said chamber, and a sectional plate resting upon said tray and adapted to receive the article to be cooled, said plate being movable upon said tray to advance successive sections thereof beyond said tray and said sections being detachable, one from the other when thus advanced.

3. In a refrigerator, the combination of a cooling chamber, a tray movable within said chamber, said tray being supported above the bottom of said chamber, and a sectional plate slidably supported by, but above, said tray, the sections of said plate loosely engaging each other, whereby they may be successively detached as said plate is advanced.

4. In a refrigerator, the combination of a cooling chamber, a tray movable within said chamber, said tray being ribbed on its under side so as to be supported above the bottom of said chamber, and a sectional plate slidably resting upon said tray and adapted to receive the article to be cooled, said plate being ribbed on its under side so as to be supported above said tray and the sections thereof having a dove-tailed engagement with each other, whereby they may be successively detached as said plate is advanced.

5. In a refrigerator, the combination of a cooling chamber, a tray movable within said chamber, a door for said chamber pivotally hung from the under side of said tray at its outer end, and a sectional plate slidably supported by, but above, said tray, the sections of said plate loosely engaging each other, whereby they may be successively detached as said plate is advanced.

Signed by me this 3rd day of April, 1909.

HERMAN BIEDER.

Attested by—
ANNA L. GILL,
JNO. F. OBERLIN.